US011430997B2

(12) United States Patent
Howe (10) Patent No.: US 11,430,997 B2
(45) Date of Patent: Aug. 30, 2022

(54) PROCESS FOR SEPARATING AND RECYCLING A SPENT ALKALINE BATTERY

(71) Applicant: Battery Reclamation Research Associates LLC, Virginia Beach, VA (US)

(72) Inventor: Dennis L. Howe, Killen, AL (US)

(73) Assignee: Battery Reclamation Research Associates LLC, Virginia Beach, VA (US)

(*) Notice: Subject to any disclaimer, the term of this patent is extended or adjusted under 35 U.S.C. 154(b) by 3 days.

(21) Appl. No.: 16/671,836

(22) Filed: Nov. 1, 2019

(65) Prior Publication Data

US 2021/0135250 A1  May 6, 2021

(51) Int. Cl.
*H01M 6/52* (2006.01)
*C01G 9/02* (2006.01)
(Continued)

(52) U.S. Cl.
CPC ............... *H01M 6/52* (2013.01); *C01G 9/02* (2013.01); *C01G 45/02* (2013.01); *C01G 45/10* (2013.01);
(Continued)

(58) Field of Classification Search
CPC ....................................................... H01M 6/52
See application file for complete search history.

(56) References Cited

U.S. PATENT DOCUMENTS 4,071,421 A  1/1978 Masters et al.
4,618,428 A  10/1986 Kim
(Continued)

FOREIGN PATENT DOCUMENTS

CN  104229898 A  12/2014
CN  110752384 A  *  2/2020
(Continued)

OTHER PUBLICATIONS

Machine translation of CN110752384 (no date).*
Rafael Gudim Da Silva, et al.; "Recovery of Manganese and Zinc from Spent Zn—D and Alkaline Batteries in Acidic Medium"; Quim. Nova, vol. 33, No. 9, 1957-1961, 2010.
(Continued)

*Primary Examiner* — Amanda C. Walke
(74) *Attorney, Agent, or Firm* — McGuireWoods LLP (57) ABSTRACT

A variety of systems, methods and compositions are disclosed, including, in one method for recycling a spent alkaline battery comprising: dissolving insoluble metal ions in aqueous solution thereby producing pregnant leach solution; extracting zinc sulfate from aqueous solution thereby producing zinc sulfate product and raffinate solution comprising manganese sulfate and potassium sulfate; separating manganese hydroxide from raffinate solution thereby producing manganese sulfate product and aqueous potassium sulfate solution; crystallizing aqueous potassium sulfate solution to produce solid potassium sulfate product. A system for recycling spent alkaline battery comprising: first liquid-solid extraction unit capable of dissolving insoluble metal ions in aqueous solution thereby producing pregnant leach solution; liquid-liquid extraction unit capable of extracting zinc from pregnant leach solution; second liquid-solid extraction unit capable of precipitating manganese hydroxide from raffinate produced by liquid-liquid extraction unit; and third liquid-solid extraction unit capable of crystallizing aqueous potassium sulfate solution produced by second liquid-solid extraction unit.

9 Claims, 4 Drawing Sheets

(51) Int. Cl.
*C01G 45/02* (2006.01)
*C01G 45/10* (2006.01)
*H01M 4/38* (2006.01)
*H01M 4/505* (2010.01)
*H01M 10/24* (2006.01)

(52) U.S. Cl.
CPC ........... *H01M 4/381* (2013.01); *H01M 4/505* (2013.01); *H01M 10/24* (2013.01)

(56) References Cited

U.S. PATENT DOCUMENTS

| | | | |
|---|---|---|---|
| 4,992,149 A | 2/1991 | Nguyen | |
| 5,082,638 A | 1/1992 | Saikkonen | |
| 5,120,409 A | 6/1992 | Hanulik | |
| 5,135,652 A | 8/1992 | Boateng | |
| 5,458,990 A | 10/1995 | Ramskogler | |
| 6,274,104 B1 | 8/2001 | Rastas et al. | |
| 6,500,229 B1 | 12/2002 | Roux et al. | |
| 6,517,701 B1 | 2/2003 | Geisler | |
| 8,440,153 B2 | 5/2013 | Shin et al. | |
| 8,586,218 B1* | 11/2013 | Smith | H01M 6/52 429/49 |
| 8,728,419 B1* | 5/2014 | Smith | H01M 6/52 423/50 |
| 8,911,696 B1* | 12/2014 | Smith | H01M 6/52 423/50 |
| 10,186,714 B2* | 1/2019 | Slezak | H01M 6/52 |
| 2011/0274598 A1* | 11/2011 | Akridge | C22B 3/02 423/22 |
| 2017/0170532 A1* | 6/2017 | Blais | C22B 23/0423 |
| 2020/0347481 A1* | 11/2020 | Volakakis | C22B 7/007 |

FOREIGN PATENT DOCUMENTS

DE 19518643 A1 11/1996
WO 2019150005 A1 8/2019

OTHER PUBLICATIONS

Long Huai-zhong; et al.; "Solvent Extraction of Zinc Sulfate Solution"; J. Cent. South Univ. Technol. (2010) 17: p. 760-764.
Salgado A. L., et al., "Recovery of zinc and manganese from spent alkaline batteries by liquid-liquid extraction with Cyanex 272", Journal of Power Sources, Elsevier SA, vol. 115 No. 2; Apr. 10, 2003; pp. 367-373.
Zhang, et al., "Manganese metallurgy review. Part I: Leaching of ores/secondary materials and recovery of electrolytic/chemical manganese dioxide", Hydrometallurgy, Elsevier Scientific publishing Cy., Amsterdam, NL, vol. 89, No. 3-4, Oct. 25, 2007, pp. 137-159.
Extended European Search Report issued in corresponding EP Patent Application No. 20204872.4, dated Mar. 30, 2021.

* cited by examiner

PROCESS FOR SEPARATING AND RECYCLING A SPENT ALKALINE BATTERY

BACKGROUND

Alkaline batteries make up about 80% of all collected spent batteries. Consequently, there is a need and interest of finding a process for recovery of the metal ions used in spent alkaline batteries. Spent alkaline batteries may be collected, sorted, processed, and recycled. A spent alkaline battery may comprise an outer casing, a label, and a black powder material disposed within the outer casing. The spent alkaline batteries may be collected, sorted, shredded, and screened to separate the black powder material from the outer casing and the label. The black powder material may comprise, manganese oxides, zinc oxides, potassium oxides, and leftover trash and iron. The black powder material contained in spent alkaline batteries may be recovered and metal sulfates may be produced therefrom. The black powder material may be mixed with water to form a slurry. The slurry may then pass through a screen and a magnetic separator to remove any excess labels and iron remaining in the slurry. The resulting black mass slurry may now be ready for further processing.

BRIEF DESCRIPTION OF THE DRAWINGS

These drawings illustrate certain aspects of some of the systems, methods and compositions of the present disclosure, and should not be used to limit or define the systems, methods and/or compositions.

DETAILED DESCRIPTION

The black mass slurry may contain excess labels, iron, and other unwanted materials. The unwanted materials may be removed from the black mass slurry in any suitable manner and should not be limited herein. Suitable method for removing unwanted materials from the black mass slurry may include, but are not limited to, screening, wet magnetic separators, dry magnetic separators, the like, or any combinations thereof. Further processing of the black mass slurry may be described below.

Figure 1A:
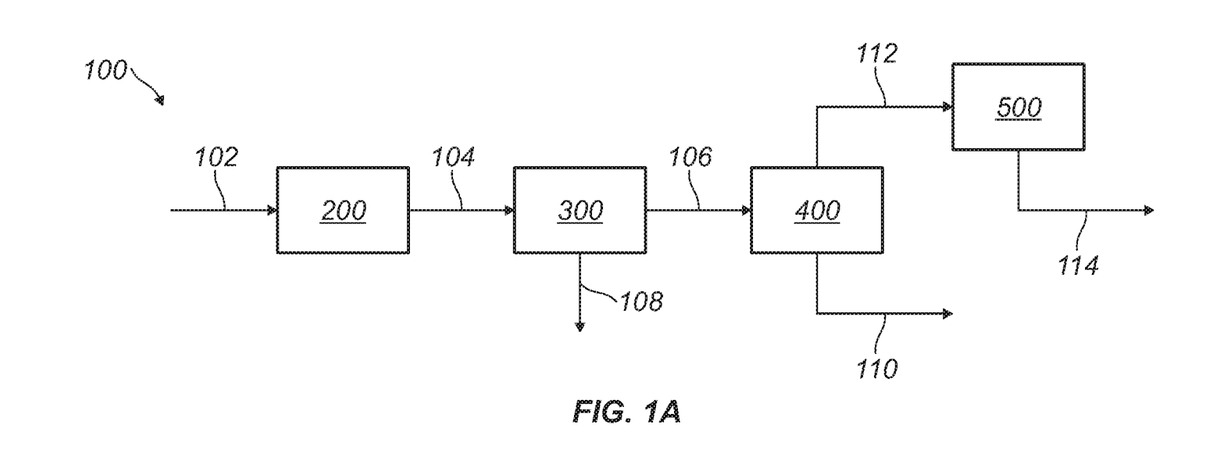
FIG. 1A illustrates an embodiment of a spent alkaline battery recycling process.

FIG. 1A illustrates an embodiment for separating and recycling the metal values found in a black mass of a spent alkaline battery 100. First, spent alkaline batteries may be processed to remove, labels, outer casings, and iron thereby leaving a black powder mass. In certain embodiments, the black powder mass may comprise insoluble metals including, but not limited to, zinc, manganese, potassium, the like, any derivatives thereof, and/or any combinations thereof. Insoluble metals may comprise metal oxides, metal hydroxides, the like, and/or any combinations thereof. In a non-limiting example, suitable metal oxides and metal hydroxides may include, zinc oxide, zinc hydroxide, manganese oxide, manganese dioxide, manganese hydroxide, potassium hydroxide, the like, and/or any combinations thereof. The black powder mass may be mixed with a base fluid to form a black mass slurry 102. Suitable base fluids may include, but are not limited to, aqueous base fluids, non-aqueous base fluids, the like, and/or any combinations thereof. In a non-limiting example, suitable base fluids may include, but are not limited to, water, brines, recycled aqueous solutions, recycled water, the like, or any combinations thereof.

Any remaining labels, iron, and/or impurities present in the black mass slurry 102 may be removed before further processing. Any processing equipment capable of removing labels, iron, and/or impurities may be used including but not limited to, filters, screens, dry magnetic separation units, wet magnetic separation units, ion exchange separation units, membrane separation units, the like, and/or any combinations thereof. The black mass slurry 102 may be ready for further processing once the black mass slurry 102 substantially comprises insoluble metals and a base fluid.

The black mass slurry 102 may then be sent to a first liquid-solid extraction unit 200 capable of converting the insoluble metals into soluble metals thereby providing a pregnant leach solution 104. In certain embodiments, soluble metals may include, but are not limited to, metal sulfates, the like, and/or any combinations thereof. Any liquid-solid extraction unit capable of dissolving the insoluble metals thereby providing a pregnant leach solution 104 may be used. In certain embodiments, the first liquid-solid extraction unit 200 may be a leaching unit. The pregnant leach solution 104 may comprise metal sulfates and water. In a non-limiting example, the pregnant leach solution may comprise zinc sulfate, manganese sulfate, potassium sulfate, water, and/or any combinations thereof.

The pregnant leach solution 104 may then be sent to a first liquid-liquid extraction unit 300 capable of separating out a specific metal sulfate from the pregnant leach solution 104. Any liquid-liquid extraction unit capable of separating an at least one metal sulfate from the pregnant leach solution 104 may be used. In certain embodiments, the first liquid-liquid extraction unit 300 may be solvent extraction unit. In a non-limiting example, the pregnant leach solution 104 may be sent to the first liquid-liquid extraction unit 300 to separate out zinc sulfate thereby producing an aqueous zinc sulfate and an aqueous raffinate 106 comprising manganese sulfate, potassium sulfate, and water. The produced aqueous zinc sulfate may then undergo further processing to provide a solid zinc sulfate 108. In certain embodiments, the produced aqueous zinc sulfate may be the desired product. In certain embodiments, the solid zinc sulfate may be the desired product. Further processing may include, but is not limited to, filtering, pH adjustment, granulation, drying, the like, and/or any combination thereof.

The aqueous raffinate 106 may then be sent to a second liquid-solid extraction unit 400 capable of separating the remaining metal sulfates. In a non-limiting example, the aqueous raffinate 106 may be sent to the second liquid-solid extraction unit 400 to precipitate out manganese hydroxide and reacting the manganese hydroxide with an acid thereby producing a manganese sulfate product 110 and an aqueous potassium sulfate 112. The manganese sulfate product 110 may then undergo further processing. In certain embodiments, the manganese sulfate product 110 may be a solid manganese sulfate product or an aqueous manganese sulfate product. Further processing may include, but is not limited to, granulation, drying, the like, and/or any combination thereof.

The aqueous potassium sulfate 112 may then be sent to a third liquid-solid extraction unit 500 capable of producing a solid potassium sulfate 114. Any suitable liquid-solid extraction unit 500 may be used and should not be limited herein. In certain embodiments, the third liquid-solid extraction unit 500 may be an evaporation-crystallization unit. In certain embodiments, solid potassium sulfate 114 may undergo further processing. Further processing may include, but is not limited to, granulation, drying, the like, and/or any combination thereof.

In certain embodiments, the metal sulfates, in liquid or solid form, may be packaged and transported to another facility for further processing and/or to aid in the production of consumer products. For example, zinc sulfate, in liquid or solid form, may be used in a number of agricultural products including, but not limited to, fertilizers, animal feed, irrigation water, and the like. Zinc sulfate, in liquid or solid form, may also be used as a feedstock for electrowinning or other zinc chemicals. In another non-limiting example, manganese sulfate, in aqueous or solid form, may be used in a number of agricultural products including, but not limited to, fertilizers, animal feed, irrigation water, and the like. Manganese sulfate, in aqueous or solid form, may also be used as a feedstock for electrowinning or other manganese chemicals, a feed stock for electrolytic manganese dioxide for battery production, the production of ferromanganese, and the like. In another non-limiting example, potassium sulfate, in aqueous or solid form, may be used for a number of agricultural products including, but not limited to, fertilizer. Metal sulfates may be used for a variety of things in a number of industries and should not be limited herein.

Figure 1B:
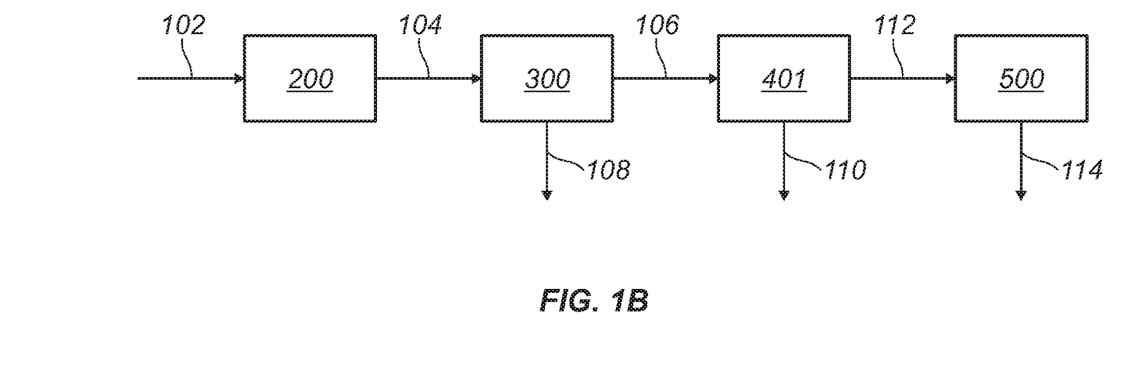
FIG. 1B illustrates an alternative embodiment of a spent alkaline battery recycling process.

Optionally, FIG. 1B illustrates an embodiment in which the aqueous raffinate 106 may be sent to a second liquid-liquid extraction unit 401 capable of separating out manganese sulfate thereby producing an aqueous manganese sulfate and an aqueous potassium sulfate 112. Any suitable liquid-liquid extraction unit capable of separating manganese sulfate and potassium sulfate may be used and should not be limited herein. In a non-limiting example, the second liquid-liquid extraction unit 401 may be a solvent extraction unit. The aqueous manganese sulfate may then undergo further processing to provide a solid manganese sulfate 110. Further processing may include, but is not limited to, filtering, pH adjustment, granulation, drying, the like, and/or any combination thereof.

Figure 2:
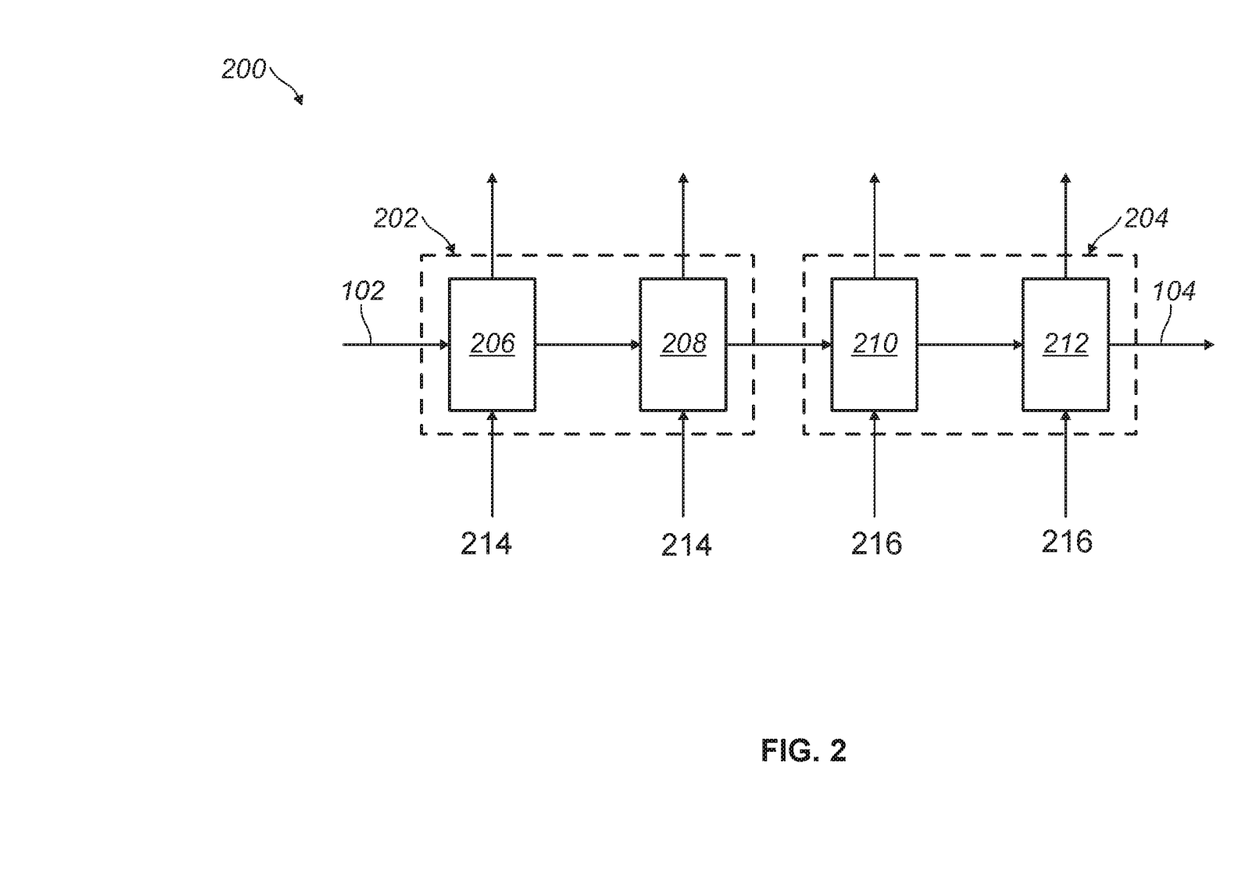
FIG. 2 illustrates an embodiment of a liquid-solid extraction unit capable of reducing insoluble metals into soluble metals in a spent alkaline battery recycling process.

FIG. 2 illustrates an embodiment of a first liquid-solid extraction unit 200 capable of reducing insoluble metals into soluble metals in a spent alkaline battery recycling process. In certain embodiments, liquid-solid extraction unit 200 may be a leaching unit. Leaching involves the dissolution of desired target metals into an aqueous phase by contacting a leach solution 214, 216, which contains leaching agents, with the black mass slurry 102, thereby obtaining a pregnant leach solution 104 with dissolved target metals and a leached waste material with reduced content of target metals, which may be disposed of or subjected to other processing steps.

The liquid-solid extraction unit 200 may involve heap leaching, agitation leaching, in-situ leaching, dump leaching, vat leaching, pressure leaching, or any other kind of leaching technique. Prior to leaching, the black slurry feed material 102 may be subjected to comminution (e.g. crushing, grinding, etc.), separation/concentration (e.g. screening, sieving, etc.), drying, roasting, blending, agglomeration, curing, oxidation, reduction, among many others process steps. Leaching may be thus performed preferably either in a tank, a vessel, a reactor, a column, a heap, a pile, a dump, a vat, or in situ, among other alternatives, and more preferably in a heap, a stirred tank reactor, a rotating drum reactor, a column-type reactor, or any combinations thereof.

Liquid-solid extraction unit 200 may operate at a pressure in the range of about ambient to about 100 psig, or about ambient to about 15 psig, or about 15 psig to about 100 psig, or any value or range of values therein. Liquid-solid extraction unit 200 may operate at a temperature in the range of about ambient to about 225° F.

Liquid-solid extraction unit 200 may comprise a single leaching stage or multiple leaching stages, which may be operated in batch or continuous modes, and may involve different leach solutions 214, 216 which may contact consecutively the black mass slurry 102. In certain embodiments, leaching may be carried out in at least about two or more leaching stages.

Liquid-solid extraction unit 200 may use any suitable leach solution 214, 216 or plurality of leach solutions 214, 216 for a given application. Each leach solution 214, 216 may comprise an at least one leaching agent. In certain embodiments, the leaching agent may be an acid. Suitable leaching agents may include, but are not limited to, carbon dioxide ($CO_2$), sulfur dioxide ($SO_2$), carbonic acid ($H_2CO_3$), sulfurous acid ($H_2SO_3$), sulfuric acid ($H_2SO_4$), hydrochloric acid (HCl), nitric acid ($HNO_3$), formic acid (HCOOH), acetic acid ($CH_3COOH$), oxalic acid (HOOC-COOH), hydrogen cyanide (HCN), carbonates in general, among others, and/or any combinations thereof. Leaching agents may be added to the leach solution 214, 216 or directly to the black mass slurry 102. Some leaching agents may even be added during the leaching process.

In a non-limiting example, the first stage 202 may comprise reacting the black mass slurry 102 with a first leach solution 214 comprising sulfur dioxide thereby reducing insoluble manganese dioxide present in the black mass slurry 102. The second stage 204 may comprise reacting the partially reduced black mass slurry 218 with a second leach solution 216 comprising sulfuric acid thereby reducing the remaining insoluble metals present in the black mass slurry 102.

In certain embodiments, additional acid such as phosphoric acid, sulfuric acid, the like, or any combinations thereof, may be added to the leaching solution leaving the leaching process to aid in complete dissolution of the insoluble metal ions. In certain embodiments additional acid may be added in excess to the leaching solution in an amount of about 0.0001% to about 20% by weight. Additionally, the liquid-solid extraction unit 200 may comprise an additional liquid-solid separation step (not shown) after the leaching and before the pregnant leach solution 104 is continued in the process. The additional liquid-solid separation step may be carried out with a filter or a centrifuge that is placed in the outlet of the liquid-solid extraction unit 200.

Figure 3:
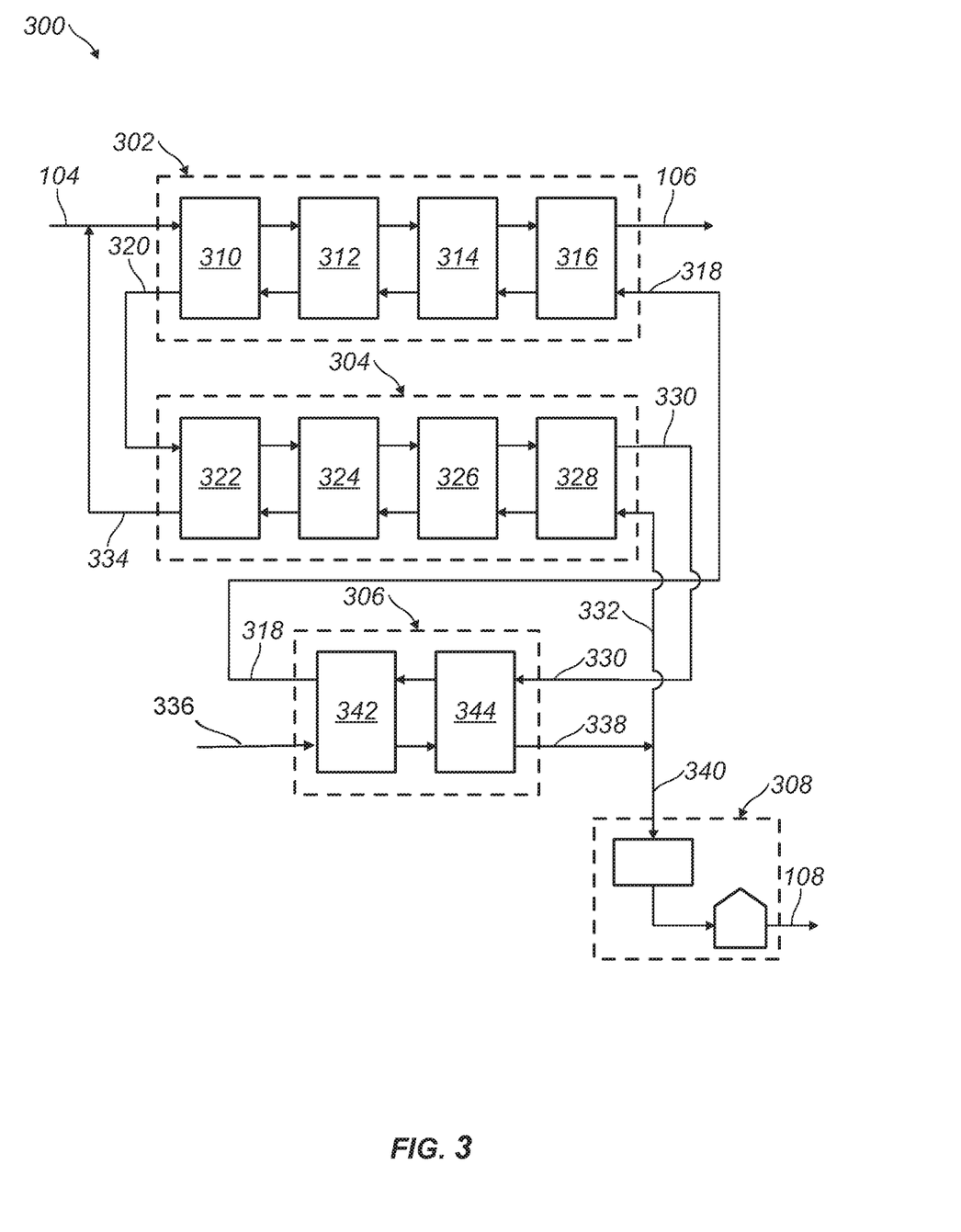
FIG. 3 illustrates an embodiment for extracting zinc sulfate in a spent alkaline battery recycling process.

FIG. 3 illustrates an embodiment for extracting zinc sulfate in a spent alkaline battery recycling process. In certain embodiments, the pregnant leach solution 104 may be sent from liquid-solid extraction unit 200 (referring to FIG. 2) to a zinc sulfate extraction unit 300. Zinc sulfate extraction unit 300 may be a liquid-liquid extraction unit, a liquid-solid extraction unit, the like, and/or any combinations thereof. In certain embodiments, zinc sulfate extraction unit 300 may comprise a plurality of processing units. For example, zinc sulfate extraction unit 300 may comprise a first liquid-liquid extraction unit 302, a second liquid-liquid extraction unit 304, and a third liquid-liquid extraction unit 306. Any suitable liquid-liquid extraction unit 302, 304, 306 may be used and should not be limited herein. Suitable liquid-liquid extraction unit 302, 304, 306 may include, but is not limited to, a solvent extraction unit, ion exchange extraction unit, an absorption unit, an adsorption unit, a scrubbing unit, a stripping unit, the like, and/or any combinations thereof. In an embodiment, the first liquid-liquid extraction unit 302 may be a solvent extraction unit, the second liquid-liquid extraction unit 304 may be a scrubbing unit, and the third liquid-liquid extraction unit 306 may be a stripping unit.

The pregnant leach solution 104 may be sent from liquid-solid extraction unit 200 (referring to FIG. 2) to solvent extraction unit 302. Solvent extraction unit 302 may be a counter-current or a co-current, continuous, batch, or semi-batch process. Solvent extraction unit 302 may comprise a single extraction stage or multiple extraction stages, and may be connected in any configuration (e.g. series, parallel, series-parallel, interlaced, etc.). Each extraction stage 310, 312, 314, 316 may comprise a mixer-settler unit, a mixer, a reactor, a thickener, a pulsated column, a pulsed packed extraction column, a pulsed sieve-tray extraction column, a karr extraction column, a rotating disc contactor, a stirred cell extraction column, an agitated column, a baffled column, a spray column, a graesser, the like, or any combinations thereof. In certain embodiments, solvent extraction may comprise about three or more extraction stages connected in series. Zinc sulfate may be extracted from the pregnant leach solution 104 by contacting the pregnant leach solution 104 with an organic solution 318 comprising one or more metal extractants so as to selectively transfer zinc ions from the pregnant leach solution 104 into the organic solution 318 thereby providing a resultant loaded organic solution 320 comprising zinc ions, and a raffinate solution 106 comprising water, manganese sulfate, and potassium sulfate. Further processing of the raffinate solution 106 will be discussed in greater detail below. In certain embodiments, zinc extraction unit 300 may comprise several pregnant leach solutions feeding different extraction stages as well as several raffinates returned to different leach stages or operations (not shown) and should not be limited herein.

Organic solution 318 may comprise one or more metal extracting agents dissolved in a water-immiscible organic solvent or diluent. Suitable water-immiscible organic solvents may include, but are not limited to, aliphatic and aromatic hydrocarbons such as kerosene, benzene, toluene, xylene, and the like, among others, and/or any combinations thereof. In certain embodiments, suitable water-immiscible organic solvents may be aliphatic and aromatic hydrocarbons having flash points of about 90° C. or greater, and solubility in water of about less than 0.1% by weight. In certain embodiments, the organic solution may be low in aromatic content. In certain embodiments, an organic solution may have an aromatic content of about 1,000 mg/kg or less. These solvents are also essentially non-toxic, chemically inert, and the costs thereof are currently within practical ranges.

The one or more metal extracting agents or extractants of the organic solution 318 may comprise organophosphorus compounds such as di-2-ethylhexyl phosphoric acid (also called D2EHPA, DEHPA, or HDEHP), dinonyl phenyl phosphoric acid (also called DNPPA), 2-ethylhexyl phosphonic acid mono-2-ethylhexyl ester, bis-2,4,4-trimethylpentyl phosphinic acid, bis-2,4,4-trimethylpentyl-dithiophosphinic acid, bis-2,4,4-trimethylpentyl-monothiophosphinic acid, trioctylphosphine oxide (also called TOPO), trialkylphosphine oxides (a mixture of 4 trialkylphosphine oxides, namely trihexylphosphine oxide, dihexylmonooctyl-phosphine oxide, dioctylmonohexyl-phosphine oxide, and trioctylphosphine oxide), triisobutylphosphine sulfide, octyl-phenyl-N,N-diisobutyl-carbamoylmethylphosphine oxide (also called CMPO), octyl phenyl acid phosphate (also called OPAP), tributyl phosphate (also called TBP), the like, or any combinations thereof.

In a non-limiting example, solvent extraction unit 302 may be a continuous process comprising four counter-current stages 310, 312, 314, 316, connected in series wherein each stage may comprise a mixer-settler unit. Organic solution 318 may comprise kerosene in an amount of about 60% to about 80% by volume of the organic solution 318 and DEHPA in an amount of about 20% to about 40% by volume of the organic solution 318. In each stage 310, 312, 314, 316, pregnant leach solution 104 may be mixed with organic solution 318, wherein the pregnant leach solution 104 and organic solution 318 may be immiscible. After mixing, both phases may be allowed to settle. Settling may allow gravity to separate both solutions such that at least a portion of zinc ions are transferred to the organic solution 318. This process may occur in each stage 310, 312, 314, 316. This process may result in a loaded organic solution 320. In certain embodiments, loaded organic solution 320 may comprise zinc ions and at least a portion of manganese ions. Zinc ions may be present in the loaded organic solution 320 in an amount of about 0.5% to about 2% by weight of loaded organic solution 320, and, optionally, manganese ions may be present in the loaded organic solution 320 in an amount of about 0.0001% to about 0.05% by weight of loaded organic solution 320.

Loaded organic solution 320 may then be sent to an absorption unit 304 thereby extracting the manganese ions present in the loaded organic solution 320. Any suitable absorption unit 304 may be used and should not be limited herein. Suitable absorption unit 304 may include, but are not limited to, mixer-settler unit, a mixer, a reactor, a thickener, a pulsated column, a pulsed packed extraction column, a pulsed sieve-tray extraction column, a karr extraction column, a rotating disc contactor, a stirred cell extraction column, an agitated column, a baffled column, a spray column, a graesser, a column contact unit, ion exchange unit, the like, and/or any combinations thereof.

Absorption unit 304 may be a counter-current or a co-current, continuous, batch, or semi-batch process. Absorption unit 304 may comprise at least two or more extraction stages, and may be connected in any configuration (e.g. series, parallel, series-parallel, interlaced, etc.). Each absorption stage 322, 324, 326, 328 may comprise a mixer-settler, a mixer, a settler, a reactor, a thickener, a pulsated column, a pulsed packed extraction column, a pulsed sieve-tray extraction column, a bubble column, a sparged tank, a differential contactor, a karr extraction column, a rotating disc contactor, a stirred cell extraction column, an agitated column, a baffled column, a spray column, a graesser, the like, or any combinations thereof.

Absorption unit 304 may extract the manganese ions from the loaded organic phase 320. The loaded organic phase 320 may be scrubbed by an aqueous solution 332 comprising an inorganic acid thereby producing a zinc rich organic phase 330 and an aqueous extract phase 334. Any inorganic acid capable of removing the manganese ions from the loaded organic phase may be used and should not be limited herein. In certain embodiments, the inorganic acid may be produced zinc sulfate, wherein the zinc sulfate is a portion of the zinc sulfate produced from a stripping unit 306. In certain embodiments, produced zinc sulfate may be recycled to the scrubber in an amount of about 5% to about 20% of the produced zinc sulfate. In certain embodiments, zinc sulfate may be produced and used in the scrubbing unit 304 by reacting zinc oxide with an acid. The value of pH in the scrubbing process may be selected such that the manganese ions are allowed to pass from the loaded organic phase 320 into the aqueous extract phase 334. Manganese ions remaining in the aqueous extract phase 334 after the absorption process may be recovered and recycled back into the solvent-extraction unit 302 and the zinc rich organic phase 330 may then be further processed which will be discussed in greater detail below.

In an embodiment, absorption unit 304 may comprise a counter-current continuous multi-stage scrubbing unit, wherein the scrubbing unit may comprise four stages. Each stage 322, 324, 326, 328 may comprise a mixer-settler unit. The loaded organic solution may be scrubbed by a zinc sulfate solution during mixing. After mixing, both phases may be allowed to settle. Settling may allow gravity to separate both solutions such that the manganese sulfate is transferred to the aqueous extract phase. This process may occur in each stage 322,324,326,328. The value of pH in the scrubbing process may range from about 0.5 to about 2.5, or any value or range of values therein. The overall volume ratio of the organic phase to the aqueous phase may range from about 5:1 to about 20:1, or any value or range of values therein. The volume ratio of the organic phase to the aqueous phase for each absorption stage may range from about 1:4 to about 4:1, or any value or range of values therein.

The zinc rich organic phase 330 may then be sent to a stripping unit 306 in which zinc sulfate may be removed from the zinc rich organic phase 330 thereby producing a stripped organic phase 318 and a zinc sulfate stripped solution 338. Any suitable stripping unit may be used. Stripping unit 306 may be a counter-current or a co-current, continuous, batch, or semi-batch process. Stripping unit may comprise at least two or more extraction stages. Each extraction stage 342, 344 may comprise a mixer-settler unit, a mixer, a reactor, a thickener, a pulsated column, a pulsed packed extraction column, a pulsed sieve-tray extraction column, a karr extraction column, a rotating disc contactor, a stirred cell extraction column, an agitated column, a baffled column, a spray column, a graesser, the like, or any combinations thereof. In an embodiment, the zinc rich organic phase 330 may be contacted with a dilute acid solution 336 to remove zinc ions from the zinc rich organic phase 330 and into a zinc sulfate stripped solution 338. The stripped organic phase 318 may be recycled back to the solvent extraction unit 302. The value of pH in the stripping process may be selected such that the zinc ions are allowed to pass from the zinc rich organic phase 330 into the zinc sulfate stripped solution 338. In certain embodiments, at least a portion of the zinc sulfate stripped solution 338 may be recycled back to absorption unit 304. The remaining portion of the zinc sulfate stripped solution may then be further processed to provide a zinc sulfate product 108. In certain embodiments, zinc sulfate product 108 may be an aqueous zinc sulfate product or a solid zinc sulfate product. In an embodiment, additional processes in which the zinc sulfate stripped solution 338 may undergo may include, but are not limited to, filtering, adjusting the pH to precipitate out insoluble zinc ions, granulation, drying, the like, or any combinations thereof. Any suitable equipment capable of processing the zinc sulfate stripped solution to provide a zinc sulfate product may be used and should not be limited herein. The stripped organic phase 318 may then be recycled back to solvent extraction unit 302.

The zinc rich organic phase 330 may be contacted with any suitable dilute acidic solution 336 may be used and should not be limited herein. Suitable dilute acidic solutions may include, but are not limited to, sulfuric acid, phosphoric acid, nitric acid, hydrochloric acid, the like, or any combinations thereof.

In certain embodiments, the acidic stripping solution may not be saturated at first (e.g. if it was previously subjected to electrowinning in order to produce another metal product prior to stripping), but will become saturated as the zinc sulfate is stripped from the organic solution.

In an embodiment, stripping unit 306 may comprise a counter-current continuous multi-stage stripping unit 306, wherein the stripping unit 306 may comprise two stages. Each stage 342, 344 may comprise a mixer-settler unit. The zinc rich organic phase 330 is mixed with a dilute acid solution 336. In certain embodiments, the dilute acid solution 336 comprises at least one of sulfuric acid, phosphoric acid, nitric acid, hydrochloric acid, the like, or any combinations thereof. After mixing, both phases may be allowed to settle. Settling may allow gravity to separate both solutions such that zinc sulfate is removed from the zinc rich organic phase 330 and into a zinc sulfate stripped solution 338. The stripped organic phase 318 may then be recycled to the first liquid-liquid extraction unit 302. In certain embodiments, at least a portion of the zinc sulfate stripped solution 338 may be recycled back to a second liquid-liquid extraction unit 304. The remaining portion of the zinc sulfate stripped solution may then be further processed to provide a zinc sulfate product 108. In certain embodiments, zinc sulfate product 108 may be a liquid zinc sulfate product or a solid zinc sulfate product. In certain embodiments, zinc sulfate extraction unit 300 may be modified to product zinc oxide and/or hydroxide.

Figure 4:
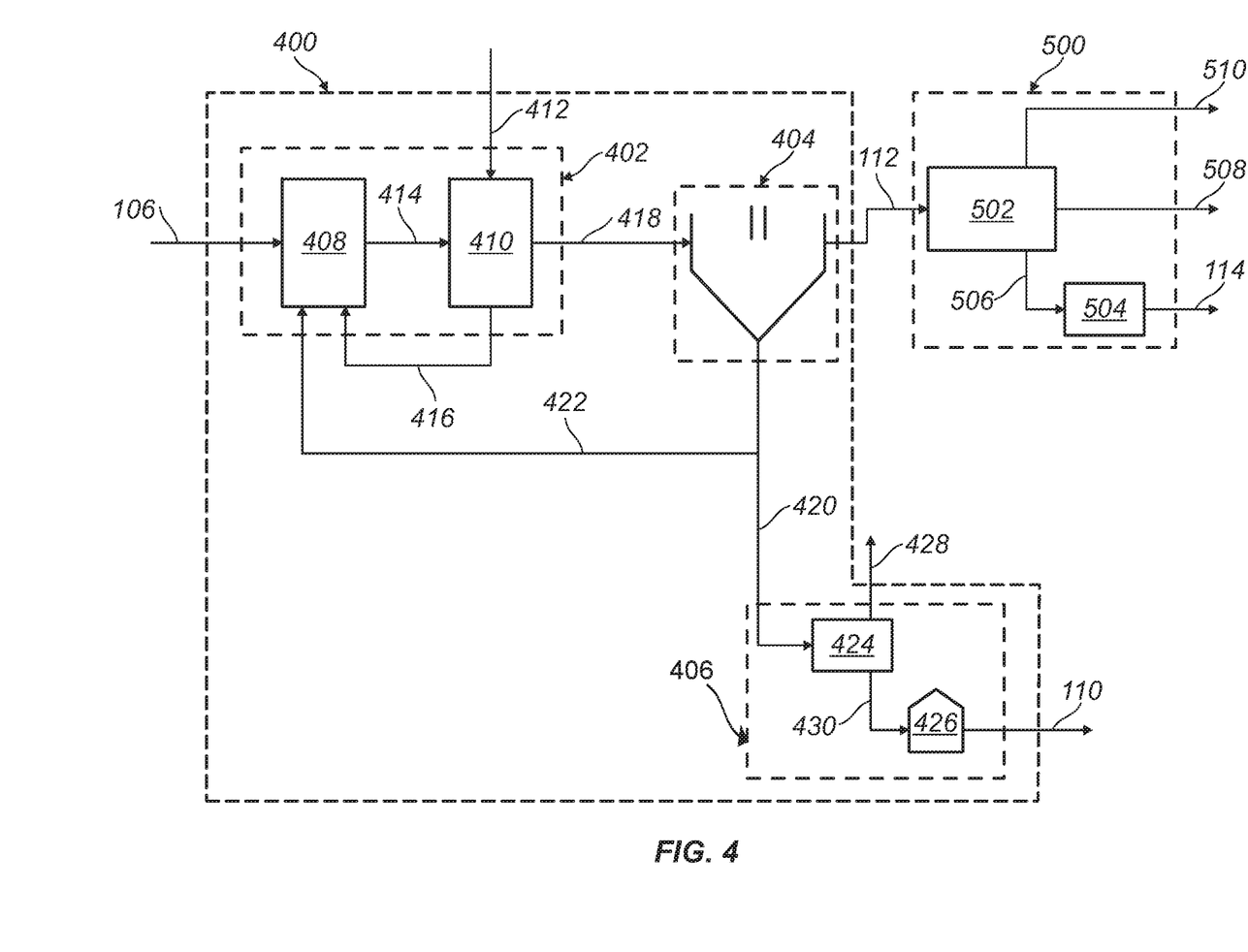
FIG. 4 illustrates an embodiment for separating manganese sulfate and potassium sulfate in a spent alkaline battery recycling process.

FIG. 4 illustrates an embodiment for separating manganese sulfate and potassium sulfate. In certain embodiments, the raffinate solution 106 may be sent from solvent extraction unit 302 to manganese extraction unit 400. Any suitable extraction unit capable of separating manganese metal ions and potassium metal ions may be used. Manganese extraction unit 400 may be a liquid-solid extraction unit, a liquid-liquid extraction unit, the like, and/or any combinations thereof. In certain embodiments, manganese extraction unit 400 may be a liquid-solid extraction unit capable of chemically precipitating manganese out of raffinate solution 106. Suitable liquid-solid extraction units may include, but are not limited to, gravity settlers, clarifiers, deep thickeners, thickeners, lamella separators, settling tanks, sediment centrifuges, tubular bowl, skimmer pipe, disc, scroll discharge, hydrocyclones, classifiers, reactors, mixer-settlers, the like, and/or any combinations thereof. In a non-limiting example, manganese extraction unit 400 may comprise a pH adjustment unit 402 and a thickener 404.

The pH adjustment unit 402 may be any unit capable of adjusting the pH of raffinate solution 106 such that manganese hydroxide may precipitate therefrom. The pH adjustment unit 402 may comprise a reactor and/or a plurality of reactors 408, 410. In certain embodiments, pH adjustment unit 402 may comprise two or more reactors and may be connected in any configuration (e.g. series, parallel, series-parallel, interlaced, etc.). The pH of the raffinate solution 106 may be adjusted such that manganese hydroxide may precipitate out thereby forming a slurry 418. In certain embodiments, a neutralizing agent 412 may be added to the reactor and/or reactors 408, 410. Neutralizing agent 412 may adsorb on the surface of the insoluble manganese hydroxide present in the reactors 408, 410, thereby adjusting the pH of the reactors. Any suitable neutralizing agent may be used and should not be limited herein. Suitable neutralizing agents may include alkali metal compounds, alkaline earth metal compounds, the like, and/or any combinations thereof. Non-limiting examples of neutralizing agents may include, but are not limited to, potassium hydroxide, sodium hydroxide, potassium carbonate, sodium carbonate, limestone, dolomitic lime, lime, calcium carbonate, the like, and/or any combinations thereof. After the pH of reactor 410 is adjusted such that manganese hydroxide may precipitate out of the solution, thereby forming a slurry 418. Slurry 418 may comprise insoluble manganese hydroxide, neutralizing agent 412, and aqueous potassium sulfate. In an embodiment, a portion of the precipitated manganese hydroxide and the neutralizing agent 412 may be recycled back to reactor 408 by way of recycle stream 416.

The remaining portion of slurry 418 may then be sent to a thickener 404. Thickener 404 may allow the insoluble manganese hydroxide to settle out from the aqueous potassium sulfate, thereby forming a high density sludge comprising insoluble manganese hydroxide. The aqueous potassium sulfate may be removed from thickener 404 by way of overflow stream 112. The high density sludge may be removed from thickener 404 by way of underflow stream 420.

A portion of the high density sludge may be recycled back to reactor 408 by way of recycle stream 422. In certain embodiments, about 50% by weight or more of the insoluble manganese hydroxide present in the high density sludge may be recycled back to reactor 408 by way of recycle stream 422.

In certain embodiments, a flocculating agent may be added to slurry 418 and/or thickener 404 to aid in settling. Any suitable flocculating agent may be used including, but not limited to, a high molecular weight non-ionic polymer, a high molecular weight non-ionic copolymer, a high molecular weight anionic polymer, a high molecular weight anionic copolymer, the like, and/or any combinations thereof. As used herein, "high molecular weight" refers to a molecular weight of about 500,000 or greater. Suitable flocculating agents may include, but are not limited to, polyacrylamide, polyethylene oxide, dextran, the like, and/or any combinations thereof. The amount of flocculating agent used may be directly related to the size of the thickener 404. For example, as the amount of flocculating agent added to slurry 418 increases, the size requirements for thickener 404 decreases (i.e. the size of the thickener may be smaller).

In a non-limiting example, raffinate solution 106 may be sent to a first reactor 408, wherein the raffinate solution 106 may be reacted with recycle stream 416 and recycle stream 422 thereby forming slurry 414. In certain embodiments, the amount of recycled insoluble manganese hydroxide to precipitated manganese hydroxide present in recycle stream 416 may be a ratio of about 1:1 to about 1:3, or about 1:3 or greater. In certain embodiments, the amount of recycled insoluble manganese hydroxide to precipitated manganese hydroxide present in recycle stream 422 may be a ratio of about 1:20 or greater. Slurry 414 may be sent to a second reactor 410. The slurry may react with a neutralizing agent 412 thereby increasing the pH of reactor 410 such that manganese hydroxide may precipitate out. In a non-limiting example, the difference in pH between reactor 408 and reactor 410 may be about 2 to about 4, or any value or range of values therein. The retention time in reactor 408 and reactor 410 may range from about 2 min or greater, or about 2 minutes to about 15 minutes, or about 15 minutes to about 8 hours, or any value or range of values therein. In an alternative embodiment, raffinate solution 106 may be sent to reactor 410 and the neutralizing agent may be added to reactor 408 and should not be limited herein. In certain embodiments neutralizing agent 412 may be potassium hydroxide. After manganese hydroxide has precipitated out, thereby forming slurry 418. At least a portion of slurry 418 is recycled back to reactor 408 by way of recycle stream 416. A flocculating agent may then be added to a portion of slurry 418 that is not recycled and then may be sent to thickener 404.

Thickener 404 may allow the insoluble manganese hydroxide to settle thereby producing an overflow stream 112 comprising aqueous potassium sulfate and an underflow stream 420 comprising insoluble manganese hydroxide. The underflow stream 420 may comprise insoluble manganese hydroxide. A portion of the insoluble manganese hydroxide may be recycled back to reactor 408 via recycle stream 422. The portion of underflow stream 420 not recycled may be filtered to remove any remaining remnants of potassium sulfate 428 and washed with a water to remove any soluble potassium sulfate. The portion of underflow stream 420 not recycled may be filtered and washed at least one or more times, to ensure complete separation and conversion of the manganese hydroxide from the potassium sulfate. Filtered potassium sulfate remnants 428 may be sent to a vent scrubber (not shown) for further processing and use. Any suitable filter capable of cake washing may be used including, but not limited to, a horizontal vacuum belt filter, a horizontal filter press, the like, or any combinations thereof. The insoluble manganese hydroxide may then be re-dissolved in water and sulfuric acid to provide a manganese sulfate solution 430 which may then further processed to provide a solid manganese sulfate product 110. In an embodiment, additional process in which the manganese sulfate solution 430 may undergo may include, but are not limited to, filtering, adjusting the pH to precipitate out insoluble zinc ions, granulation, drying, the like, or any combinations thereof. Any suitable equipment capable of processing the manganese sulfate solution 430 to provide a solid manganese sulfate product 110 may be used and should not be limited herein. Suitable equipment may include, but is not limited to, fluidized bed dryer, fluidized bed granulator, rotary drum granulator, spray driers, the like, or any combinations thereof.

The overflow aqueous potassium sulfate may then be sent to evaporation-crystallization unit 500 to provide solid potassium sulfate 506. Any suitable evaporation-crystallization unit 500 may be used and should not be limited herein. In an embodiment, evaporation crystallization unit 500 may be a mechanical vapor recompression evaporator-crystallizer or a multiple effect evaporator. The crystallized potassium sulfate may then be removed from the evaporation-crystallization unit 500 in any suitable method including, but not limited to, by way of centrifuge. The crystallized potassium sulfate may then be dried to provide solid potassium sulfate 114. Crystallized potassium sulfate may be dried using any suitable process including but not limited to, fluidized bed dryer, rotary drum dryer, the like, or any combinations thereof. In certain embodiments, solid potassium sulfate may be granulated. Condensate 510 may be recycled to another part of process 100 (referring to FIG. 1).

The black mass compositions disclosed herein may directly or indirectly affect one or more components or pieces of equipment associated with the preparation, delivery, recapture, recycling, reuse, separation, and/or disposal of the disclosed separation processes. For example, the black mass slurry compositions may directly or indirectly affect one or more mixers, related mixing equipment, pits, storage facilities or units, composition separators, heat exchangers, sensors, gauges, pumps, compressors, and the like used generate, store, monitor, regulate, and/or recondition the exemplary black mass compositions. The disclosed black mass compositions may also directly or indirectly affect any transport or delivery equipment used to convey the black mass compositions to a processing unit, within a processing unit, or from a processing unit such as, for example, any transport vessels, conduits, pipelines, trucks, tubulars, and/or pipes used to compositionally move the black mass compositions from one location to another, any pumps, compressors, or motors used to drive the black mass compositions into motion, any valves or related joints used to regulate the pressure or flow rate of the black mass compositions, and any sensors (i.e., pressure and temperature), gauges, and/or combinations thereof, and the like. The disclosed black mass compositions may also directly or indirectly affect the various equipment found within a process such as, mixers, reactors, tanks, gravity settlers, clarifiers, deep thickeners, thickeners, lamella separators, settling tanks, sediment centrifuges, tubular bowl, skimmer pipe, disc, scroll discharge, hydrocyclones, classifiers, reactors, mixer-settlers, a pulsated column, a pulsed packed extraction column, a pulsed sieve-tray extraction column, a bubble column, a sparged tank, a differential contactor, a karr extraction column, a rotating disc contactor, a stirred cell extraction column, an agitated column, a baffled column, a spray column, a graesser, a scrubber unit, a wet scrubber unit, a spray scrubber unit, a venturi scrubber unit, falling film adsorber unit, a packed bed absorber unit, a packed bed unit, a column contact unit, ion exchange unit, the like, and any combinations thereof.

Accordingly, this disclosure describes systems, methods, and compositions that may relate to alkaline battery recycling operations. The systems, methods, and compositions may further be characterized by one or more of the following statements:

Statement 1: A method for recycling a spent alkaline battery comprising: dissolving insoluble metal ions in an aqueous solution thereby producing a pregnant leach solution; extracting zinc sulfate from the aqueous solution thereby producing a zinc sulfate product and a raffinate solution comprising manganese sulfate and potassium sulfate; separating manganese hydroxide from the raffinate solution thereby producing a manganese sulfate product and an aqueous potassium sulfate solution; crystallizing the aqueous potassium sulfate solution to produce a solid potassium sulfate product.

Statement 2: The method of statement 1, wherein insoluble metal ions comprise at least one of manganese dioxide, manganese hydroxide, manganese oxide, zinc hydroxide, zinc oxide, potassium hydroxide, potassium oxide, and any combination thereof.

Statement 3: The method of statement 1 or 2, wherein dissolving the insoluble metal ions in an aqueous solution further comprises: reacting manganese dioxide with sulfur dioxide to produce a soluble manganese sulfate; reacting manganese hydroxide, zinc hydroxide, and potassium hydroxide with sulfuric acid to produce additional soluble manganese sulfate, soluble zinc sulfate, and soluble potassium sulfate.

Statement 4: The method of any of the preceding statements, wherein extracting zinc metal ions further comprises: contacting the aqueous solution with an organic solution to produce a loaded organic phase and the raffinate solution; contacting the loaded organic phase with an aqueous solution comprising an inorganic acid to produce a zinc rich organic phase; and contacting the zinc rich organic phase with dilute sulfuric acid to produce the zinc sulfate product.

Statement 5: The method of any of the preceding statements, wherein the organic solution comprises a water-immiscible organic solvent selected from the group consisting of kerosene, benzene, toluene, xylene, and any combination thereof, and a metal extracting agent selected from the group consisting of di-2-ethylhexyl phosphoric acid, dinonyl phenyl phosphoric acid, 2-ethylhexyl phosphonic acid mono-2-ethylhexyl ester, bis-2,4,4-trimethylpentyl phosphinic acid, bis-2,4,4-trimethylpentyl-dithiophosphinic acid, bis-2,4,4-trimethylpentyl-monothiophosphinic acid, trioctylphosphine oxide, trialkylphosphine oxides, triisobutylphosphine sulfide, octyl-phenyl-N,N-diisobutyl-carbamoylmethylphosphine oxides, octyl phenyl acid phosphate, tributyl phosphate, and any combinations thereof.

Statement 6: The method of any of the preceding statements, wherein separating the manganese hydroxide further comprises: reacting the raffinate solution with a neutralizing agent thereby adjusting the pH of the raffinate solution to about 9 or greater; separating insoluble manganese hydroxide from aqueous potassium sulfate; reacting the insoluble manganese hydroxide with an acid to produce liquid manganese sulfate; drying the liquid manganese sulfate; and granulating the manganese sulfate to produce a solid manganese sulfate product.

Statement 7: The method of any of the preceding statements, wherein the neutralizing agent is selected from the group consisting of potassium hydroxide, sodium hydroxide, potassium carbonate, sodium carbonate, limestone, dolomitic lime, lime, calcium carbonate, and any combinations thereof, and wherein the acid is selected from the group consisting of sulfuric acid, phosphoric acid, nitric acid or hydrochloric acid, and any combinations thereof.

Statement 8: The method of any of the preceding statements, wherein separating the manganese hydroxide further comprises: contacting the raffinate solution with an organic solution to produce a loaded organic phase and the aqueous potassium sulfate solution; contacting the loaded organic phase with an aqueous solution comprising an inorganic acid to produce a manganese rich organic phase; and contacting the manganese rich organic phase with a dilute acid to produce the manganese sulfate product.

Statement 9: The method of any of the preceding statements, wherein crystallizing the aqueous potassium sulfate further comprises: evaporating the aqueous potassium sulfate; and crystallizing the evaporated potassium sulfate to produce the solid potassium sulfate product.

Statement 10: The method of any of the preceding statements, further comprising: packaging the zinc sulfate product, the manganese sulfate product, and the solid potassium sulfate product; transporting the packaged products to a second processing facility, wherein the second processing facility produces agricultural products; adding the packaged products to the second processing facility to produce an agricultural product.

Statement 11: A system for recycling a spent alkaline battery comprising: a first liquid-solid extraction unit capable of dissolving a insoluble metal ions in an aqueous solution thereby producing a pregnant leach solution; a liquid-liquid extraction unit capable of extracting zinc from the pregnant leach solution; a second liquid-solid extraction unit capable of precipitating a manganese hydroxide from a raffinate produced by the liquid-liquid extraction unit; and a third liquid-solid extraction unit capable of crystallizing an aqueous potassium sulfate solution produced by the second liquid-solid extraction unit.

Statement 12: The system of statement 11, wherein the first liquid-solid extraction unit comprises two stages, wherein a first stage comprising reacting the insoluble metal ions with sulfur dioxide, and wherein a second stage comprising reacting the insoluble metal ions with sulfuric acid.

Statement 13: The system of statement 11 or 12, wherein the liquid-liquid extraction unit further comprises: a first liquid-liquid extraction unit capable of contacting the pregnant leach solution with an organic phase to produce a loaded organic phase and a raffinate solution; a second liquid-liquid extraction unit capable of contacting the loaded organic phase with an aqueous solution comprising an inorganic acid to produce a zinc rich organic phase; and a third liquid-liquid extraction unit capable of contacting the zinc rich organic phase with dilute sulfuric acid to produce a zinc sulfate product.

Statement 14: The system of any of the preceding statements, wherein the second liquid-solid unit further comprises: a pH adjusting unit capable of forming a suspension fluid comprising a soluble potassium metal ion and an insoluble manganese hydroxide; and a thickener capable of separating the aqueous potassium sulfate from the insoluble manganese hydroxide.

Statement 15: The system of any of the preceding statements, wherein the pH adjustment unit comprises a first reactor and a second reactor connected in series, wherein a neutralizing agent is added to the second reactor to adjust the pH of the raffinate solution to about 9 or greater thereby precipitating insoluble manganese hydroxide therefrom.

Statement 16: The system of any of the preceding statements, further comprising: a reactor comprising an acid capable of converting the insoluble manganese hydroxide to soluble manganese sulfate; a dryer capable of removing a liquid from the soluble manganese sulfate; and a granulator capable of increasing the size of the insoluble manganese sulfate to provide a solid manganese sulfate product.

Statement 17: The system of any of the preceding statements, wherein the third liquid-solid unit further comprises: an evaporator capable of evaporating the aqueous potassium sulfate; and a crystallizer capable of crystallizing evaporated aqueous potassium sulfate to produce a solid potassium sulfate product.

Statement 18: The system of any of the preceding statements, further comprising: a granulator capable of increasing the size of the produced solid potassium sulfate product.

Statement 19: A system for recycling a spent alkaline battery comprising: a leaching unit capable of dissolving insoluble metal ions in an aqueous solution thereby producing a pregnant leach solution; a zinc extraction unit capable of extracting zinc sulfate from the pregnant leach solution wherein the zinc extraction unit further comprises: a solvent-extraction unit thereby contacting the pregnant leach solution with an organic phase to produce a loaded organic phase and a raffinate solution; an absorption unit thereby contacting the loaded organic phase with an aqueous solution comprising an inorganic acid to produce a zinc rich organic phase; and a stripping unit thereby contacting the zinc rich organic phase with dilute sulfuric acid to produce a zinc sulfate product; a chemical precipitation unit capable of precipitating a manganese metal ion from a raffinate produced by the zinc extraction unit, wherein the chemical precipitation unit further comprises: a pH adjustment unit capable of raising the pH such that manganese hydroxide is precipitated out, and a thickener capable of separating the manganese hydroxide from the aqueous potassium sulfate; and an evaporation-crystallization unit capable of crystallizing an aqueous potassium sulfate solution produced by the chemical precipitation unit.

Statement 20: The system of statement 19, wherein the pH adjustment unit further comprises a first reactor and a second reactor connected in series, wherein a neutralizing agent is added to the second reactor thereby adjusting the pH to about 9 or greater.

Therefore, the present disclosure is well adapted to attain the ends and advantages mentioned as well as those that are inherent therein. The particular systems, methods and operating conditions disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative systems, methods and conditions disclosed above may be altered or modified and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method for recycling a spent alkaline battery comprising:
    dissolving insoluble metal ions in an aqueous solution thereby producing a pregnant leach solution; wherein the insoluble metal ions comprise at least one of manganese dioxide, manganese hydroxide, manganese oxide, zinc hydroxide, zinc oxide, potassium hydroxide, potassium oxide, and any combination thereof;
    extracting zinc sulfate from the aqueous solution thereby producing a zinc sulfate product and a raffinate solution comprising manganese sulfate and potassium sulfate;
    separating manganese hydroxide from the raffinate solution thereby producing a manganese sulfate product and an aqueous potassium sulfate solution;
    crystallizing the aqueous potassium sulfate solution to produce a solid potassium sulfate product.

2. The method of claim 1, wherein dissolving the insoluble metal ions in an aqueous solution further comprises:
    reacting manganese dioxide with sulfur dioxide to produce a soluble manganese sulfate;
    reacting manganese hydroxide, zinc hydroxide, and potassium hydroxide with sulfuric acid to produce additional soluble manganese sulfate, soluble zinc sulfate, and soluble potassium sulfate.

3. The method of claim 1, wherein extracting zinc metal ions further comprises:
    contacting the aqueous solution with an organic solution to produce a loaded organic phase and the raffinate solution;

contacting the loaded organic phase with an aqueous solution comprising an inorganic acid to produce a zinc rich organic phase; and contacting the zinc rich organic phase with dilute sulfuric acid to produce the zinc sulfate product.

4. The method of claim 3, wherein the organic solution comprises a water-immiscible organic solvent selected from the group consisting of kerosene, benzene, toluene, xylene, and any combination thereof, and a metal extracting agent selected from the group consisting of di-2-ethylhexyl phosphoric acid, dinonyl phenyl phosphoric acid, 2-ethylhexyl phosphonic acid mono-2-ethylhexyl ester, bis-2,4,4-trimethylpentyl phosphinic acid, bis-2,4,4-trimethylpentyl-dithiophosphinic acid, bis-2,4,4-trimethylpentyl-monothiophosphinic acid, trioctylphosphine oxide, trialkylphosphine oxides, triisobutylphosphine sulfide, octyl-phenyl-N,N-di-isobutyl-carbamoylmethylphosphine oxides, octyl phenyl acid phosphate, tributyl phosphate, and any combinations thereof.

5. The method of claim 1, wherein separating the manganese hydroxide further comprises:
reacting the raffinate solution with a neutralizing agent thereby adjusting the pH of the raffinate solution to about 9 or greater;
separating insoluble manganese hydroxide from aqueous potassium sulfate;
reacting the insoluble manganese hydroxide with an acid to produce liquid manganese sulfate;
drying the liquid manganese sulfate; and
granulating the manganese sulfate to produce a solid manganese sulfate product.

6. The method of claim 5, wherein the neutralizing agent is selected from the group consisting of potassium hydroxide, sodium hydroxide, potassium carbonate, sodium carbonate, limestone, dolomitic lime, lime, calcium carbonate, and any combinations thereof, and wherein the acid is selected from the group consisting of sulfuric acid, phosphoric acid, nitric acid or hydrochloric acid, and any combinations thereof.

7. The method of claim 1, wherein separating the manganese hydroxide further comprises:
contacting the raffinate solution with an organic solution to produce a loaded organic phase and the aqueous potassium sulfate solution;
contacting the loaded organic phase with an aqueous solution comprising an inorganic acid to produce a manganese rich organic phase; and
contacting the manganese rich organic phase with a dilute acid to produce the manganese sulfate product.

8. The method of claim 1, wherein crystallizing the aqueous potassium sulfate further comprises:
evaporating the aqueous potassium sulfate; and
crystallizing the evaporated potassium sulfate to produce the solid potassium sulfate product.

9. The method of claim 1, further comprising:
packaging the zinc sulfate product, the manganese sulfate product, and the solid potassium sulfate product;
transporting the packaged products to a second processing facility, wherein the second processing facility produces agricultural products;
adding the packaged products to the second processing facility to produce an agricultural product.

* * * * *